United States Patent
Natoli et al.

(10) Patent No.: US 7,474,663 B2
(45) Date of Patent: Jan. 6, 2009

(54) FLEXIBLE AND SCALABLE METHOD FOR HANDLING TELECOMMUNICATION EQUIPMENTS THROUGH THE CONTROL OF ATM ACCESS NETWORKS

(75) Inventors: Vittorio Natoli, Ronciglione (IT); Marco Barili, Rome (IT); Giacomo Mangani, Haegersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 668 days.

(21) Appl. No.: 10/501,749

(22) PCT Filed: Jan. 9, 2003

(86) PCT No.: PCT/EP03/00144

§ 371 (c)(1),
(2), (4) Date: Mar. 24, 2005

(87) PCT Pub. No.: WO03/061332

PCT Pub. Date: Jul. 24, 2003

(65) Prior Publication Data

US 2005/0180424 A1  Aug. 18, 2005

(30) Foreign Application Priority Data

Jan. 15, 2002  (EP) .................. 02425012

(51) Int. Cl.
*H04L 12/66* (2006.01)
*H04Q 11/04* (2006.01)
(52) U.S. Cl. .................. 370/395.5; 370/401

(58) Field of Classification Search ............. 370/395.5, 370/401
See application file for complete search history.

(56) References Cited

U.S. PATENT DOCUMENTS

| 5,841,990 | A  | * | 11/1998 | Picazo et al. ............... 709/249 |
| 5,856,921 | A  | * | 1/1999  | Kim et al. ..................... 700/3 |
| 5,970,068 | A  | * | 10/1999 | Gray et al. ............... 370/395.5 |
| 6,006,275 | A  | * | 12/1999 | Picazo et al. ............... 709/249 |
| 6,205,152 | B1 | * | 3/2001  | Von Ahnen et al. .... 370/395.63 |
| 6,608,832 | B2 | * | 8/2003  | Forslow ..................... 370/353 |
| 6,930,890 | B1 | * | 8/2005  | Branscomb ................ 361/788 |
| 6,937,566 | B1 | * | 8/2005  | Forslow ..................... 370/231 |
| 7,023,845 | B1 | * | 4/2006  | Simons et al. ............. 370/389 |
| 2002/0057700 | A1 | * | 5/2002 | Sreedharan et al. .... 370/395.63 |
| 2004/0205188 | A1 | * | 10/2004 | Ahlard et al. ............... 709/224 |

FOREIGN PATENT DOCUMENTS

| EP | 1 051 047 A | 11/2000 |
| WO | 00/74381 A | 12/2000 |
| WO | 01/73987 A | 10/2001 |

* cited by examiner

*Primary Examiner*—Alpus H Hsu
(74) *Attorney, Agent, or Firm*—Nixon & Vanderhye, P.C.

(57) ABSTRACT

A flexible and scalable method for handling telecommunication equipment through the control of ATM access networks, characterized in that the Board Relay (BR) functionality is attributed to any Device Processor (DP) and in that the Central Processor (CP) is connected to all the other Device Processors (DP) by simply addressing the messages to the Board Relay (BR) and relaying them through it. According to this method, the BR board supervises of all the other Device Processors (DP) on behalf of the Central Processor (CP).

10 Claims, 7 Drawing Sheets

BR-board placing (example 1) : the ET-master in the first C-AAS relays messages to all the other boards of the System Node (three levels of shelves).

DPs = 17 + (16x17) + (16x16) = 545
DPs directly connected to CP = 1 (i.e. the BR)
DPs handled by the unique BR = 544
ADSL users = (16x16)x16 x2 = 8192

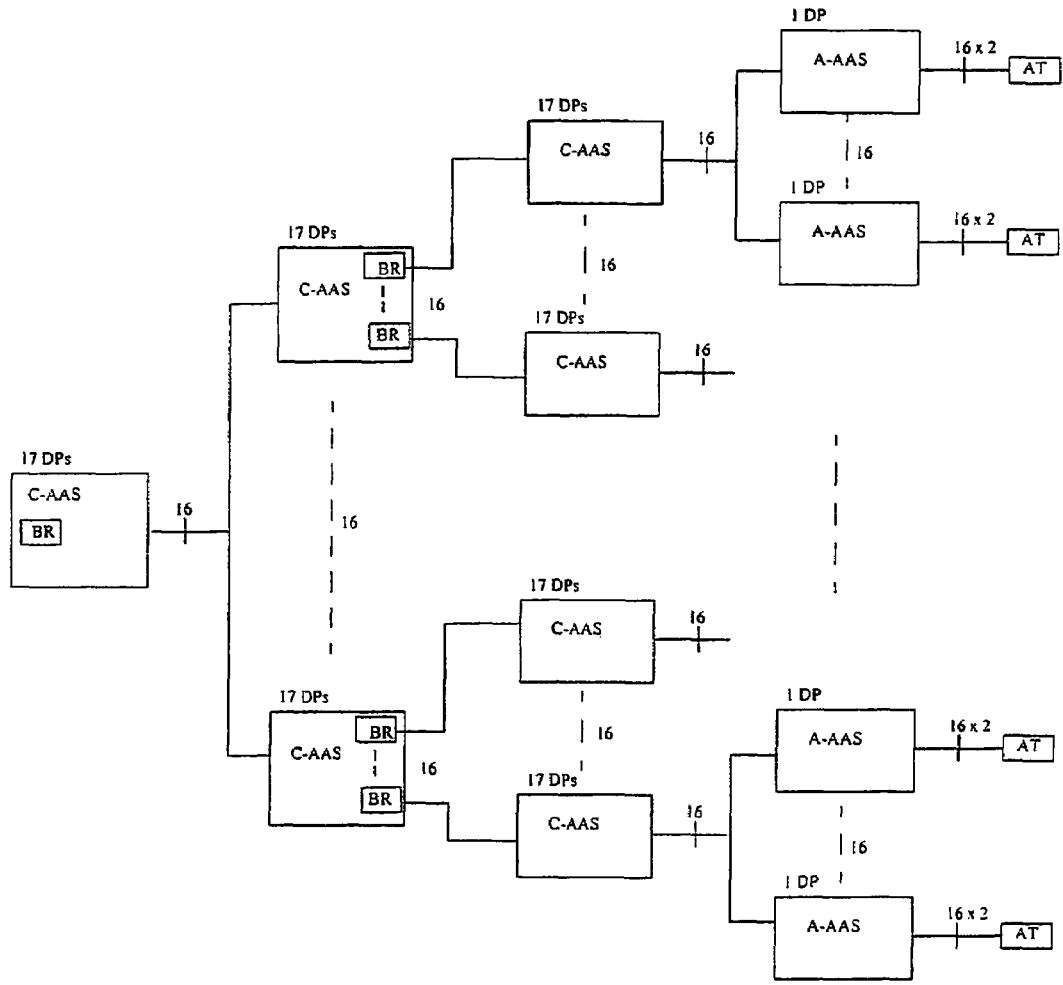

BR-boards placing (example 2): the ET-master in the first C-AAS relays messages to all the other boards of the shelf and to the master of the second level C-AASs; the other boards of the second level C-AASs act as BR relaying messages to ALL the DPs below them.

DPs = 17 + (16x17) + (16x16x17) + (16x16x16) = 8737
DPs directly connected to CP (i.e. BRs) = 1 + (16x16) = 257
DPs handled by each BR of the second level C-AAS = 17 + 16 = 33
ADSL users = (16x16x16)x16 x2 = 131072

FIG. 7

FLEXIBLE AND SCALABLE METHOD FOR HANDLING TELECOMMUNICATION EQUIPMENTS THROUGH THE CONTROL OF ATM ACCESS NETWORKS

This application is the US national phase of international application PCT/EP03/00144, filed 09 Jan. 2003, which designated the US and claims priority to EP Application No. 02425012.8 filed 15 Jan. 2002. The entire contents of these applications are incorporated herein by reference.

BACKGROUND

I. Technical Field

The present invention relates to a flexible and scalable method for handling telecommunication equipment through the control of ATM (Asynchronous Transfer Mode) access networks, in particular by implementing it within the ANx (Access Network, version x) platform, an Ericsson technology broadband access network. So far two different types of access have been provided based on the ANx platform: the ADSL (Asymmetric Digital Subscriber Line) service and a broadband radio access service LMDS (Local Multipoint Distribution Service). As the invention can be embodied indifferently in both types of access, we will refer in the following only to the ADSL architecture.

II. Related Art and Other Considerations

In the ANx system three different proprietary communication protocols are currently used, namely:

SIP (Shelf Internal Protocol) for SC-BC communication (SC=Shelf Controller, BC=Board Controller) between the SC and the BC.

SEP (Shelf External Protocol) for SC-NT communications (NT=Network Termination) between the SC and the NT.

ICS (Internal Control Support) for CP-DP communications (CP=Central Processor, DP=Device Processor) between the CP and the DP board, either using Ethernet or AAL5 (ATM Adaptation Level 5) connections.

In the technical solutions currently adopted in telecommunication equipment, it is known that one CP controls all the boards in the system node via direct ICS connections (over Ethernet or ATM, ICS/Ethernet and ICS/ATM in the following) for each DP board.

The current technical solutions have the following limitations:

For each device processor DP to be controlled by a central processor CP, one ICS pre-configured connection shall be provided. This means that, when using ATM, each connection shall be set up through the ATM network/switch, resulting in a massive usage of the ATM bandwidth for control purposes. Moreover, this would represent a cost for the operator leasing these connections and considerable work in setting up and maintaining the transport network. When using Ethernet, as many leased lines as DP boards are required, representing a massive cost for the operator.

When using the protocol stack ICS over ATM, the ATM adapter on the CP imposes the use of a single management connection PVC for each board to be reached. (PVC=Permanent Virtual Connection, is represented by a couple of VPI/VCI values, where VPI=Virtual Path Identifier, VCI=Virtual Channel Identifier).

Using commercially available ATM adapters on the CP side, only a limited number of VPI/VCI cross connections (i.e. DP boards) can be handled by one CP in case of ICS/ATM. This implies that the CP can handle a system node structured with a limited number of shelves. When several users have to be connected, they can be divided into more than one system node in order to be controlled by the CP; this is often a problem for an operator who wishes to serve sites with a high user density, because it would require maintaining more than one system node and to lease an increased number of lines for control.

The access architecture has a very low degree of scalability.

Specifically regarding ANx, the problem of the limitation on the control structure (i.e. the number of addressable DPs) could be solved by using an ATM adapter with better performance and modifying accordingly the management-connections set-up mechanism. On the other hand, this is a high cost solution in terms of re-design (big impact on software and hardware). Moreover, all the other limitations still exist and they would be of vital importance in the realization of a product from a prototype.

BRIEF SUMMARY

The present technology relates to a flexible and scalable method for handling telecommunication equipment through the control of ATM access networks, and a method which overcomes the aforementioned limitations and drawbacks.

The present technology reduces the number of DP boards directly addressable by the CP (i.e. addressable from the CP via the ICS protocol), thereby reducing the load spent in the CP for their supervision.

More precisely, the technology relates to a flexible and scalable method for handling telecommunication equipment through the control of ATM access networks. The Board Relay (BR) functionality is attributed to any DP (Device Processor) and the CP (Central Processor) is connected to all the other DPs by simply addressing the messages to the BR and relaying them through it.

In fact, by giving the functionality of the BR to any DP board (in the following we will refer to this DP board as BR board), it is possible to reach from the CP all the other DPs by just addressing the BR board, which then takes care of relaying the control messages to the specified (or relayed) DP.

The BR board also takes care of supervising all the DPs on behalf of the CP, thus reducing the CP load, which could be very high when a large number of DPs are present in the system.

The functionality of the BR is given by CP to DPs chosen according to the network configuration, through configuration messages, whereas the connections between CP and DPs take place using Ethernet and ATM network/switch.

Furthermore, the bandwidth allocated through an ATM backbone for a single management connection (PVC) is shared between the device processors (DP) supervised by the board relay (BR). The method can be very advantageously implemented both on newly designed and existing networks.

Another advantageous improvement obtained with the method, i.e. by using the board relay functionality, is to minimize the number of ATM paths or Ethernet lines required to control all the DP boards from the CP. This method minimizes the number of ATM paths (i.e. VPI/VCI cross-connections through the ATM access network) or Ethernet connections which have to be set up from the CP to each system node during the system start up and at restart; in principle, the CP is in fact able to reach all the DP boards of a single system node by having just one connection to each ET (Exchange Terminal) in the first concentrator shelf.

BRIEF DESCRIPTION OF THE DRAWINGS

The invention will be described in more detail in the following, with reference to the appended drawings, in which:

FIG. 7 is a schematic view showing a BR board placed on a shelf of a second level according to an example embodiment.

DETAILED DESCRIPTION

Figure 1:
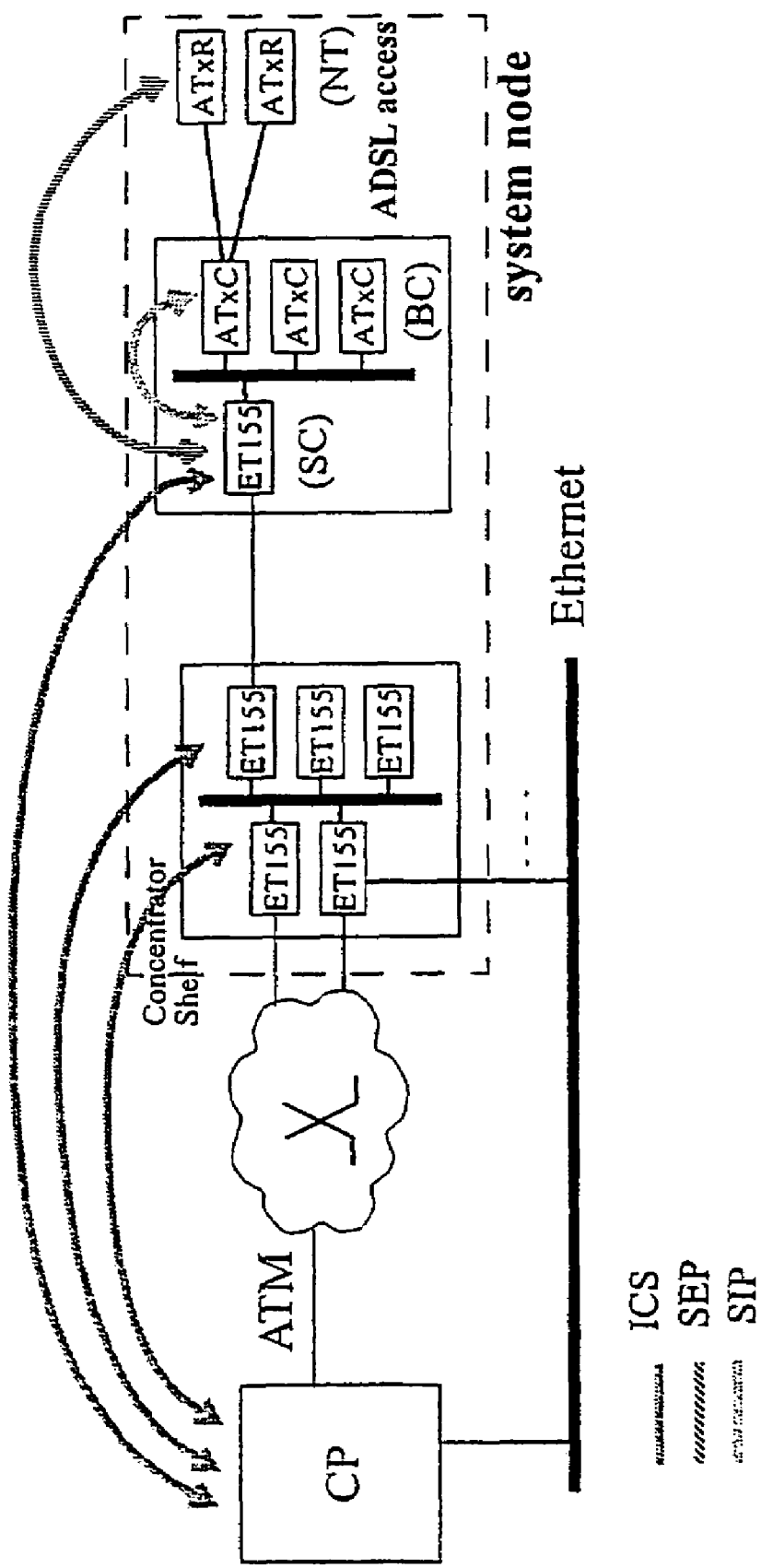
FIG. 1 is a schematic view illustrating a telecommunication system handled through the control of ATM access networks with the three different protocols already considered.
Figure 2:
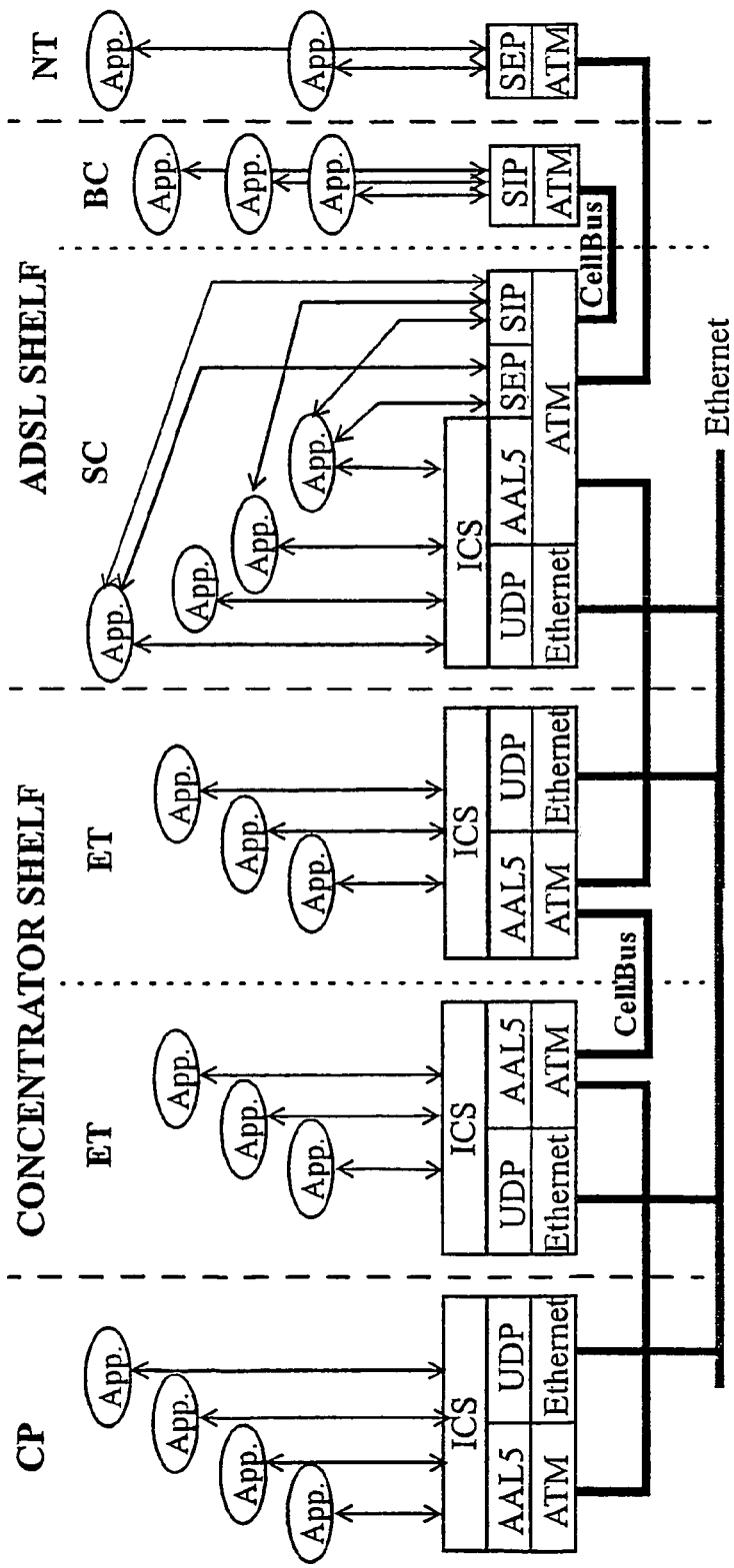
FIG. 2 is a diagram illustrating the stack of the protocols used in the ADSL Ericsson system.

As it is shown by FIG. 2 of the appended drawings, the board relay functionality is hidden inside the ICS layer of ICS protocol, which allows one to have the same interface in all the DP boards towards the applications, regardless of whether UDP (User Diagram Control) or AAL5 is used as a lower transport protocol layer.

Figure 4:
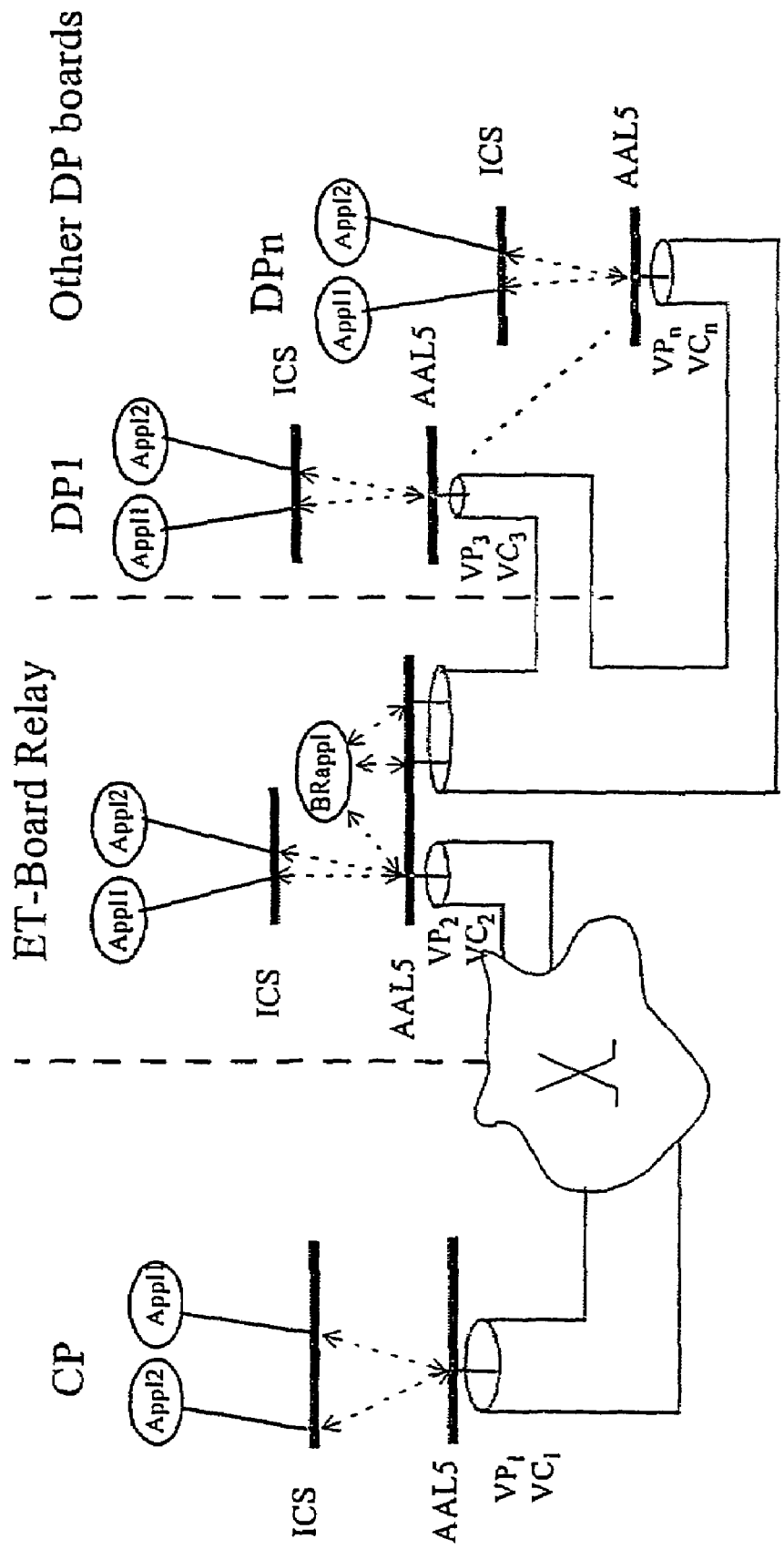
FIG. 4 is a diagram illustrating the BR (Board Relay) functionality according to an example embodiment, in which the CP-BR connection takes place via the stack of protocols ICS/ATM.
Figure 5:
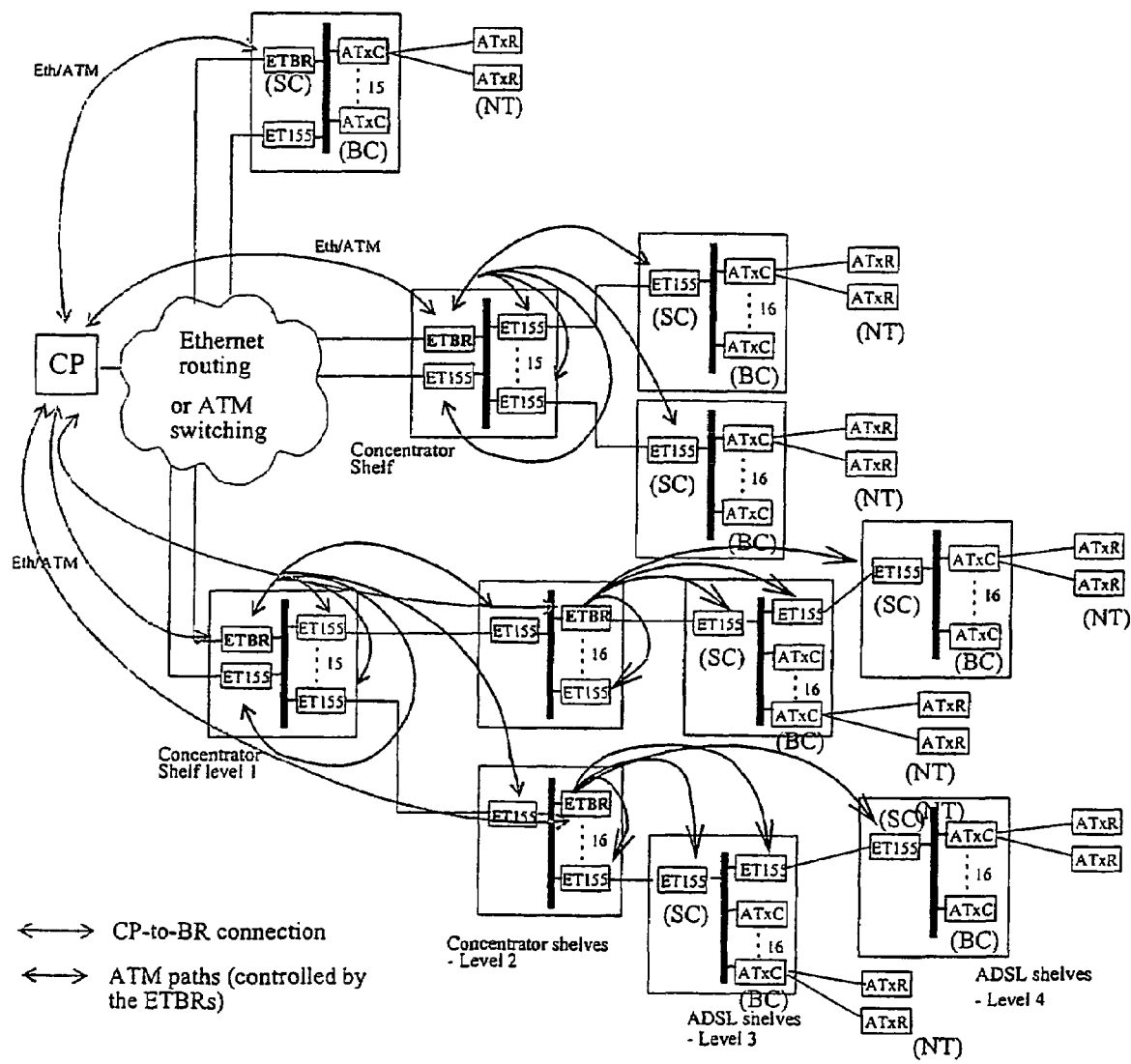
FIG. 5 illustrates how an example embodiment is practically implemented in the ADSL Ericsson access network.

The board relay functionality according to an example embodiment needs as many paths from the CP to the system node as many BR boards are used (FIG. 5). When the CP-DP communication takes place via ATM, this will result in a reduction of the number of ATM connections needed through the ATM switch (FIG. 4). When the communication is via Ethernet, it is necessary to have a single Ethernet cable from the CP to each of the BR boards, thus avoiding all the problems coming from having subracks located in a site geographically distant from that in which the CP is.

To reach the BR only one port or VPI/VCI value is needed from the CP. In the BR a port descriptor is needed to supervise the link to each relayed DP board. This means having a port descriptor table containing as many entries as the number of relayed DP boards.

Figure 3:
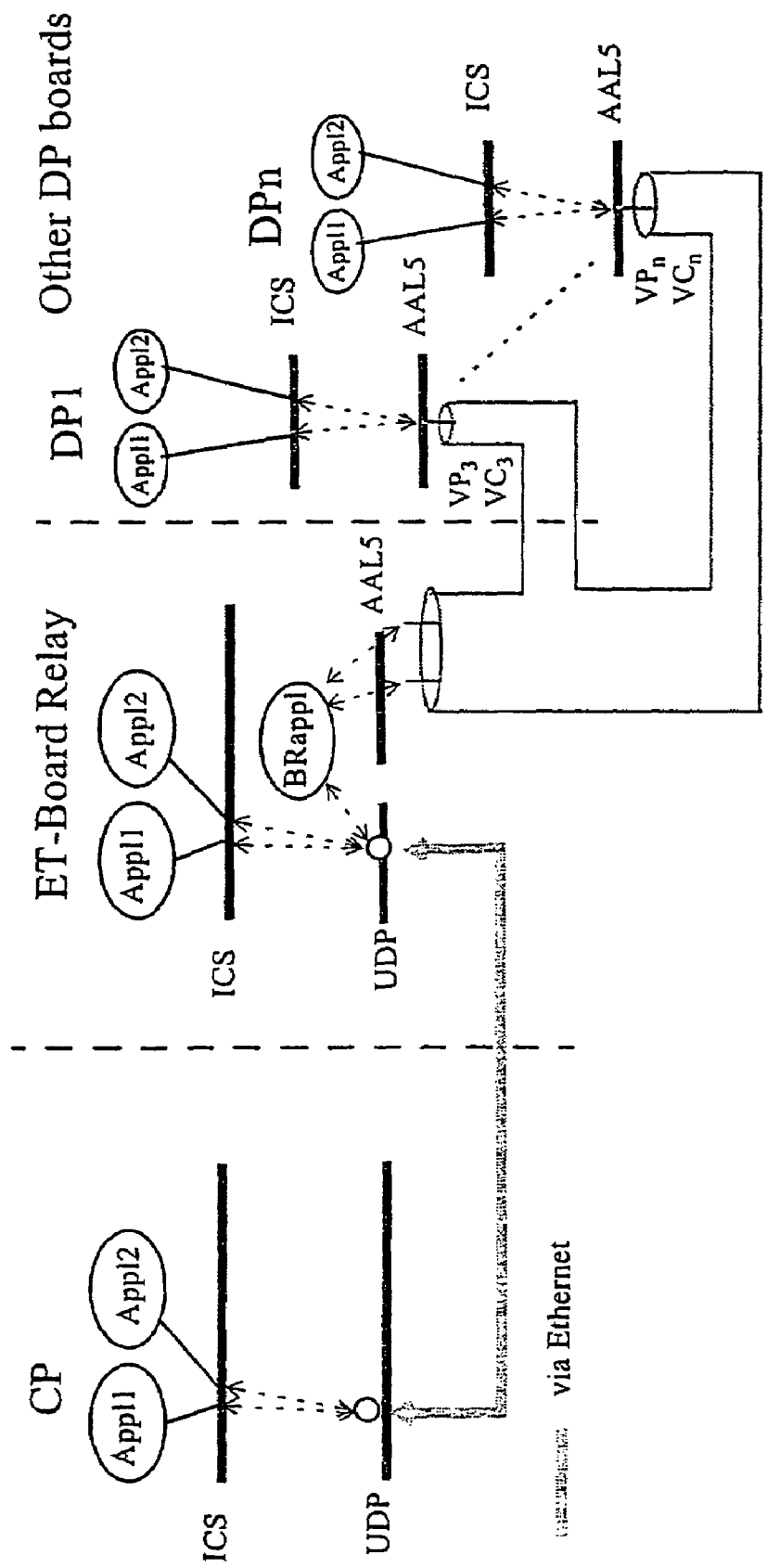
FIG. 3 is a diagram illustrating the BR (Board Relay) functionality according to an example embodiment, in which the CP-BR connection takes place via the stack of protocols ICS/Ethernet.

When the board relay is enabled, the CP can reach all the boards in the system node by using ICS (on either ATM or Ethernet) to reach the BR; then ICS over ATM is used by the BR to reach all the other relayed boards (FIG. 3).

In the development of the BR concept, the CP is able to handle up to four levels of shelves, whilst only two levels were possible with the prior art addressing strategy.

Indeed, the direct ICS addressing allows only up to two levels of shelves to be controlled by the CP (i.e., by supposing that a shelf has 16 DP, 16×16=256 DPs). This implies to handle a maximum of 16×16×2=512 ADSL users per system node.

When more than 512 users have to be connected, the CP must handle more than one system node.

It is necessary to set-up through the ATM backbone a single PVC for each DP board supervised by the remotely located CP.

Whenever the CP controls the DPs via Ethernet (ICS over Ethernet), these limitations do not exist, but as many Ethernet cables as DPs are required.

Using the board-relay concept, up to two levels of shelves ahead can instead be controlled by each BR instead of by the CP. This implies that, for example, using only one BR board placed in the first shelf and relaying messages to all the two-shelves-ahead boards, up to 16×16×16×2=8192 ADSL users per system node can be connected (theoretically they would be 31×31×31×2=59582, since in each shelf there would be 31 boards instead of 16).

Figure 6:
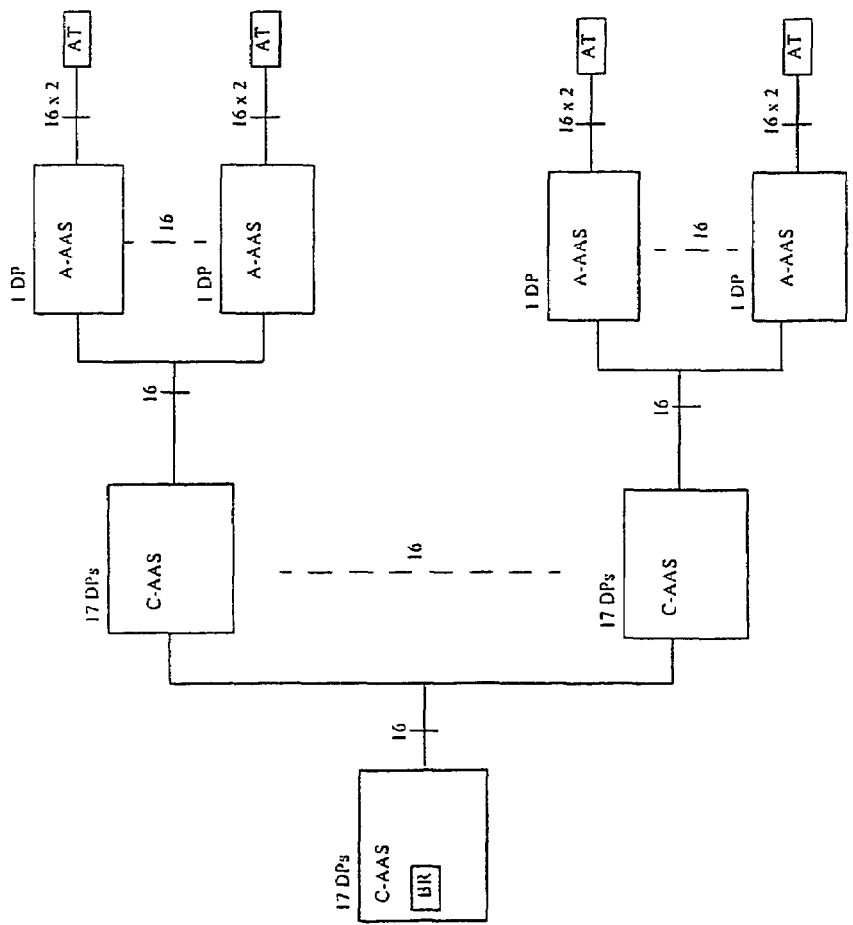
FIG. 6 is an example of the ADSL Ericsson access network with three levels of "subrack", according to an example embodiment.

FIG. 6 shows the placing of a BR board (example 1): the ET master in the first C-AAS (ATM Access Shelf of Concentrator) relays messages to all the boards of the system node (three levels of shelves).

When two or more users are to be connected, it can be decided to have the BR board placed in a shelf of the second level, thus allowing the connection of 16×16×16×16×2=131072 users, as shown in FIG. 7. From the preceding examples it is easy to understand that, using the board-relay concept, a high degree of scalability is obtained: in principle there are no limitations in placing the BR boards within the system node; moreover, the BR can be configured to relay messages to any DP in the system node in this way, if needed, it is also possible to have a different load on different BR boards (load distribution).

Furthermore, whenever needed, the CP can be configured for direct access to specific DPs and for relaying messages to other DPs (e.g. remotely located) via the local BR.

As many VPI/VCI cross-connections as BR boards plus not-relayed DPs are required to be set through the ATM switch connecting the CP to the system node.

Whenever the CP controls the DPs via Ethernet (ICS over Ethernet), as many Ethernet cables as BR boards plus not-relayed DPs are required, thus considerably reducing the number of Ethernet lines the operator shall eventually lease.

Considering the above mentioned limitations of having a direct ICS addressing from the CP, according to the state of the art, and summarizing what subsequently is described about an example embodiment, the advantages of the system using the Board Relay functionality are the following:

The CP can handle a system node having up to four levels of shelves, thus implying that up to 8737 DP boards can be handled by the CP in a unique ADSL system node by using two BR boards. (e.g. one placed in the first concentrator shelf and the other placed in the concentrator shelves of the second level); it should be noted that up to 992 BR boards can be handled by one CP in the case of ICS/ATM; thus in principle more than one fully equipped system node can be handled by the CP. The maximum number of ADSL users per system node is 131072. With the direct ICS addressing, because of the limitations in the ATM adapter, the CP can control a maximum of 992 DPs and the maximum number of ADSL users per system node is 512.

A dramatic reduction is obtained of the overall number of ICS/ATM, ICS/Ethernet connections from CP to the access network required to control all the DP boards in the system.

A drastic reduction is obtained in the number of ATM cross-connections through the ATM switch (when using ICS over ATM). This means great reduction in the ATM bandwidth usage (in terms of busy VPI/VCI) and minimization of the installation/maintenance costs.

A drastic reduction is obtained in the number of Ethernet connections through the network (when using ICS over Ethernet). This means avoiding leased lines to control remote located subracks from the central office (i.e. installation and maintenance costs are much reduced).

Advantageous load distribution is obtained: the load the CP would have required to control a large system, with the board relay concept is instead spread and distributed among the BR boards in the system node. The network could also be designed by distributing different loads on different BRs in such a way as to meet the needs of local sites and/or of specific applications to distribute the load.

Greater scalability is obtained: the BR boards can in principle be placed wherever needed in the system node and relay CP messages to any DP; this provides the access architecture with a very high degree of scalability. This is a very interesting feature for operators who wish to serve sites with different users densities.

The proposed access network architecture can be implemented both on newly designed and existing networks. It should be noted that the above stated figures refer to the development of the product ANx, even if the concept according to the invention can be more generally adopted. Moreover, it is pointed out that the concept on which the Board Relay is based can be applied to the control system of any kind of access network, in which it is required to control and supervise remotely located processors. Moreover, it is particularly useful when a small amount of bandwidth is available on the ATM switch, for controlling and supervising a large number of remote DPs.

It is intended that other possible embodiments, different from those above described and illustrated, also fall within the scope of the present invention.

The invention claimed is:

1. A method for handling telecommunication equipment through the control of ATM access networks, the method comprising:
   a Central Processor communicating to a plurality of Device Processor Boards of a shelf belonging to a system node, said communication being directly addressable to at least one Device Processor Board via a path employing Internal Control Support (ICS) protocol,
   providing a Board Relay functionality to one of plural Device Processor Boards whereby the one of the plural Device Processor Boards can relay control messages from a Central Processor to other specified Device Processor Boards,
   providing the Board Relay functionality through configuration messages from the Central Processor,
   establishing said path employing the Internal Control Support (ICS) protocol only between the Central Processor and said Device Processor Boards to which Board Relay functionality has been given.

2. The method according to claim 1, further comprising the Board Relay functionality supervising all the other Device Processors on behalf of the Central Processor.

3. The method according to claim 1, further comprising giving the Board Relay functionality is from the Central Processor to the Device Processors through configuration messages.

4. The method according to claim 1 further comprising sharing bandwidth allocated through an ATM backbone for a single management connection between the device processors supervised by the board relay.

5. The method according to claim 1, further comprising using Ethernet and ATM network/switch connections between the Central Processor and Device Processors.

6. A system for handling telecommunication equipment through an ATM access network, comprising
   at least a Central Processor communicating to a plurality of Device Processor Boards of a shelf belonging to a system node, said communication being directly addressable to at least one Device Processor Board via a path employing Internal Control Support (ICS) protocol, wherein
   to any of said Device Processor Boards is given a Board Relay functionality so that it can relay control messages from the Central Processor to other specified Device Processor Boards,
   said Board Relay functionality being given to said Device Processor Board through configuration messages from the Central Processor,
   said path employing the Internal Control Support (ICS) protocol being established only between the Central Processor and said Device Processor Boards to which Board Relay functionality has been given.

7. The system of claim 6, wherein said Board Relay functionality is hidden inside an Internal Control Support (ICS) layer of the Internal Control Support (ICS) protocol.

8. The system of claim 6, wherein said path employing Internal Control Support (ICS) protocol takes place via ATM connections through an ATM switch.

9. The system of claim 6, wherein said path employing Internal Control Support (ICS) protocol takes place via a single Ethernet cable.

10. The system of claim 6, wherein bandwidth allocated through an ATM backbone for a single management connection is shared between device processors supervised by a device processor board to which Board Relay functionality has been given.

* * * * *

UNITED STATES PATENT AND TRADEMARK OFFICE
CERTIFICATE OF CORRECTION

PATENT NO. : 7,474,663 B2 Page 1 of 1
APPLICATION NO. : 10/501749
DATED : January 6, 2009
INVENTOR(S) : Natoli et al.

It is certified that error appears in the above-identified patent and that said Letters Patent is hereby corrected as shown below:

In Column 6, Line 7, in Claim 3, after "functionality" delete "is".

In Column 6, Line 10, in Claim 4, after "claim 1" insert -- , --.

In Column 6, Line 18, in Claim 6, after "comprising" insert -- : --.

In Column 6, Line 49, in Claim 10, delete "device processor board" and insert -- Device Processor Board --, therefor.

Signed and Sealed this

Twentieth Day of October, 2009

David J. Kappos
*Director of the United States Patent and Trademark Office*